(12) United States Patent
Rietman et al.

(10) Patent No.: US 10,567,158 B2
(45) Date of Patent: Feb. 18, 2020

(54) CRYPTOGRAPHIC DEVICE AND AN ENCODING DEVICE

(71) Applicant: KONINKLIJKE PHILIPS N.V., Eindhoven (NL)

(72) Inventors: Ronald Rietman, Eindhoven (NL); Sebastiaan Jacobus Antonius De Hoogh, Oosterhout (NL); Paulus Mathias Hubertus Mechtildis Antonius Gorissen, Eindhoven (NL); Willem Charles Mallon, Eindhoven (NL); Ludovicus Marinus Gerardus Maria Tolhuizen, Waalre (NL); Hendrik Dirk Lodewijk Hollmann, Valkenswaard (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 118 days.

(21) Appl. No.: 15/767,210

(22) PCT Filed: Oct. 10, 2016

(86) PCT No.: PCT/EP2016/074166
§ 371 (c)(1),
(2) Date: Apr. 10, 2018

(87) PCT Pub. No.: WO2017/063986
PCT Pub. Date: Apr. 20, 2017

(65) Prior Publication Data
US 2019/0074959 A1 Mar. 7, 2019

(30) Foreign Application Priority Data
Oct. 12, 2015 (NL) ...................................... 2015599

(51) Int. Cl.
*H04L 9/06* (2006.01)
*H04L 9/08* (2006.01)

(52) U.S. Cl.
CPC ............ *H04L 9/0625* (2013.01); *H04L 9/085* (2013.01); *H04L 9/0819* (2013.01); *H04L 2209/34* (2013.01)

(58) Field of Classification Search
CPC ..... H04L 9/0625; H04L 9/0819; H04L 9/085; H04L 2209/34; H04L 9/002
(Continued)

(56) References Cited

U.S. PATENT DOCUMENTS 8,199,909 B2 6/2012 Dottax et al.
9,443,091 B2* 9/2016 Emmett .................. H04L 9/002
(Continued)

FOREIGN PATENT DOCUMENTS

CN 2012520589 A 2/2014
RU 2302085 C1 6/2007
(Continued)

OTHER PUBLICATIONS

Carlet et al: "Higher-Order Masking Schemes for S-Boxes"; FSE'12 Proceedings of the 19th International Conference on Fast Software Encryption, pp. 366-384, 2012.
(Continued)

*Primary Examiner* — Jeffrey C Pwu
*Assistant Examiner* — Nega Woldemariam

(57) ABSTRACT

A cryptographic device (200) is provided to compute a key dependent cryptographic function for an input message. The cryptographic device has a data store arranged to store multiple variables (w) on which the cryptographic device acts to compute the cryptographic function, a variable (w) being distributed over multiple shares ($w^j$) and represented in the data store as multiple encoded shares ($x^j$), an encoded (Continued)

share being an encoding ($x^j = \text{Enc}_j(w^j, s^j)$) of a share ($w^j$) together with a state ($s^j$), the multiple states ($s^j$) corresponding to the same variable (w) having a relationship with the input message (M) so that there exists an injective mapping ($\Sigma$) from the input message (M) to the multiple states ($\Sigma(M) = (s^0, \ldots, s^{n-1})$).

14 Claims, 6 Drawing Sheets

(58) Field of Classification Search
USPC .......................................................... 380/28
See application file for complete search history.

(56) References Cited

U.S. PATENT DOCUMENTS

| | | | |
|---|---|---|---|
| 9,525,435 | B2 | 12/2016 | Gorissen et al. |
| 9,654,280 | B2 | 5/2017 | Michiels et al. |
| 9,686,075 | B2 | 6/2017 | Gomez et al. |
| 10,180,824 | B2 | 1/2019 | Tolhuizen et al. |
| 2002/0051534 | A1* | 5/2002 | Matchett ............... H04L 9/0625 380/37 |
| 2003/0188151 | A1 | 10/2003 | Sato et al. |
| 2005/0152539 | A1* | 7/2005 | Brickell ................ G06F 7/723 380/28 |
| 2008/0253557 | A1 | 10/2008 | Dottax et al. |
| 2010/0080295 | A1* | 4/2010 | Panusopone ........... H04N 19/51 375/240.16 |
| 2010/0266120 | A1* | 10/2010 | Leggette ............. G06F 11/1012 380/28 |
| 2010/0269008 | A1* | 10/2010 | Leggette ............. G06F 11/1076 714/752 |
| 2011/0067012 | A1* | 3/2011 | Eisen ....................... G06F 8/51 717/140 |
| 2011/0202766 | A1* | 8/2011 | Lerner ................... H04L 9/002 713/168 |
| 2012/0002807 | A1* | 1/2012 | Michiels ................ H04L 9/002 380/28 |
| 2012/0300922 | A1* | 11/2012 | Billet .................... H04L 9/0618 380/28 |
| 2016/0306973 | A1 | 10/2016 | Brekers et al. |
| 2016/0328543 | A1* | 11/2016 | Hoogerbrugge ........ G06F 21/14 |
| 2017/0270307 | A1* | 9/2017 | Guilley .................. H04L 9/002 |
| 2018/0357396 | A1* | 12/2018 | Schepers ................ G06F 21/14 |

FOREIGN PATENT DOCUMENTS

| | | |
|---|---|---|
| RU | 2007101704 A1 | 7/2008 |
| WO | 2010102960 A1 | 9/2010 |
| WO | 2014095772 A1 | 6/2014 |
| WO | 2014096420 A1 | 6/2014 |
| WO | 2015082212 A1 | 6/2015 |

OTHER PUBLICATIONS

Chow et al: "White-Box Cryptography and an EAS Implementation"; SAC 2002, LNCS 2595, pp. 250-270, 2003.
Goubin et al: "DES and Differential Power Analysis: The "Duplication" Method"; CHES'99, LNCS 1717, pp. 158-172, 1999.
Ishai et al;"Private Circuits:Securing Hardware Against Probing Attacks"; CRYPTO 2003, pp. 463-481.
Pornin: Deterministic Usage of the Digital Signature Algorithm (DSA) and Elliptic Curve Digital Signature Algorithm (ECDSA); Aug. 2013, 79 Page Document.
Toft: "Solving Linear Programs Using Multiparty Computation"; LNCS 5628, pp. 90-107, 2009.

\* cited by examiner

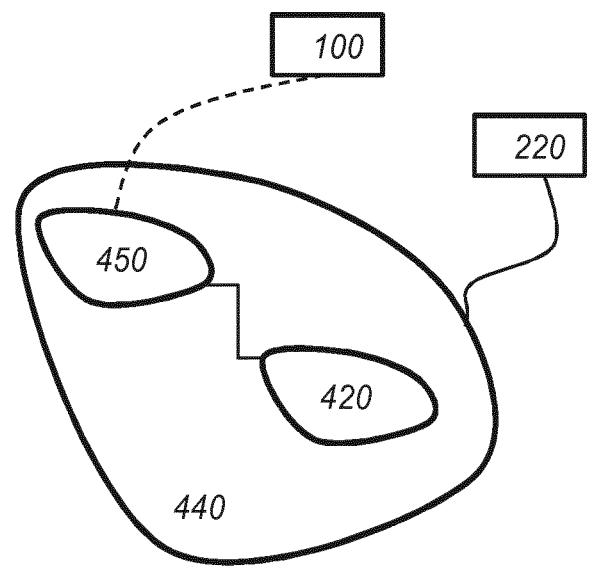
Fig. 4b
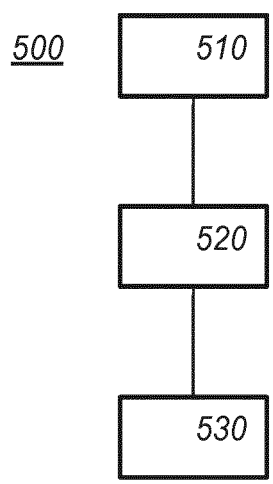 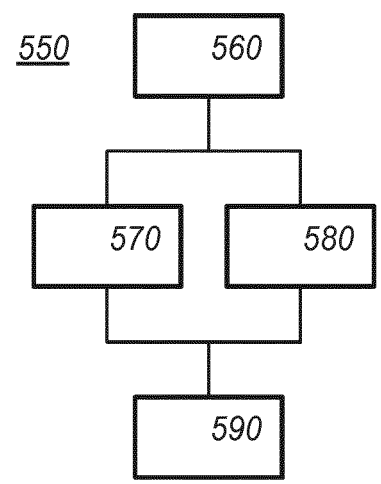
Fig. 5a                Fig. 5b

CRYPTOGRAPHIC DEVICE AND AN ENCODING DEVICE

CROSS-REFERENCE TO PRIOR APPLICATIONS

This application is the U.S. National Phase application under 35 U.S.C. § 371 of International Application No. PCT/EP2016/074166, filed on Oct. 10, 2016, which claims the benefit of NL Patent Application No. 2015599, filed on Oct. 12, 2015. These applications are hereby incorporated by reference herein.

FIELD OF THE INVENTION

The invention relates to a cryptographic device, an encoding device, a cryptographic method, an encoding method, a computer program and a computer readable medium.

BACKGROUND

When building a cryptographic device one must worry not only about choosing sound cryptographic primitives, but also about the prevention of side-channels. Through a side-channel an attacker obtains information about a cryptographic computation that goes beyond the normal input-output behavior. A side-channel attack is an attack based on information gained from the physical implementation of a cryptosystem rather than only on analysis of the cryptographic algorithm and/or brute force.

A particular strong side-channel is the so-called white-box attack model. In the white-box attack model, an attacker has full access to the internals of an algorithm during its execution. In particular, the attacker can observer variables and may even modify the data during execution. Protecting secret information such as secret keys is particularly hard in the white-box model.

In the paper "DES and the Differential Power Analysis, The "Duplication" method", by Goubin and Patarin a suggestion is given on how to prevent some side-channel attacks. In this paper a variable v is represented by k variables $v_1, \ldots, v_k$ such that $v = \Sigma v_i$. The side-channel considered in this paper is the electric consumption of the microcontroller.

The inventors have found that this solution is not adequate in the white-box model, and can be broken. It is therefore a problem to improve resistance of implementations of cryptographic functions under the white-box attack model.

SUMMARY OF THE INVENTION

A cryptographic device is provided arranged to compute a key dependent cryptographic function or an input message. The cryptographic device comprises a data store arranged to store multiple variables on which the cryptographic device acts to compute the cryptographic function, a variable being distributed over multiple shares and represented in the data store as multiple encoded shares, an encoded share being an encoding of a share together with a state, the multiple states corresponding to the same variable having a relationship with the input message so that there exists an injective mapping from the input message to the multiple states, a table store storing multiple look-up tables, a look-up table taking as input one or more encoded shares of one or more variables, the multiple look-up tables together forming a table network implementing the cryptographic function, a control unit configured to apply the cryptographic function to the input message by applying the multiple look-up tables to the variables represented in the data store.

As will be explained more fully in the description, a possible attack on an implementation of a cryptographic function is a collision attack. In a collision attack, the attacker tries to find two different input messages such that some internal variable has the same value for both of them. Such an occurrence may give information on the key.

The encoded shares represent both the shares of the variable and of the multiple states. Because there is an injective mapping from the input message to the multiple states, there cannot be two different input messages so that the corresponding two sets of multiple states are the same. As the states are part of the encoded shares, there cannot be two different input messages so that the corresponding encoded shares are the same. Accordingly, collision attacks on the encoded shares are avoided. The resulting cryptographic device is more resilient against attack under the white-box model.

The cryptographic device also provides a protection mechanism against differential power analysis. While random encodings disable successful statistical analysis on relations between different occurring values, they may still allow successful statistics on collisions. As the latter are prevented, the statistical analysis used by differential power analysis type attacks is disturbed.

In an embodiment, the table store stores a multiplication table network for multiplying a first variable distributed over a first multiple of shares and represented in the data store as a first multiple of encoded shares, and a second variable distributed over a second multiple of shares represented in the data store as a second multiple of encoded shares, the multiplication table network acting on the first and second multiple of encoded shares obtaining a third multiple of encoded shares representing the product of the first and second variable, the multiplication table network comprising one or more cross-product table sub-networks for computing the product of a first share of the first multiple shares and a second share of the second multiple of shares, the cross-product table sub-networks computing the sum of the product of the first share and the second share from the corresponding encoded shares plus a randomization function from the input message.

As will be explained in the description, computation on variables can be transformed into computation on encoded shares. In particular, two variables represented as encoded shares may be multiplied. In one embodiment of multiplication, the cross products are required, that is the product of a share of a first variable (e.g. represented as $x^i$) and a share of the second variable (e.g. represented as $y^j$). To obfuscate this computation a source of randomness may be used. The inventors have found that random number generators are easily identified and circumvented in software, thus nullifying this obfuscation. This problem may be avoided by using a randomization function from the input message. The randomization function from the input message may be fixed in the cryptographic device. The randomization function may be determined when the cryptographic device is created, in case of a software implementation at compile time of the software. As the randomization function is fixed, it cannot easily be identified within the other table networks. If the same input is used twice the randomization function will produce the same results; so this function does not stand out in the table network.

One way to ensure that an injective mapping exists is to encode the input message even before the key is used. The injective mapping may then be maintained throughout the computation up to the point variable w is created. Encoding the input message may be done by a computer external to the cryptographic device. For example, the input message may represent content that is created to be decrypted at the cryptographic device. The input message may be received by the cryptographic device in the form of multiple sets of encoded shares. However, the encoding may also be done at the cryptographic device, e.g., to protect exposing the key through a collision attack.

An encoding device is provided for encoding an input message for use with a cryptographic device as in claim 1. The encoding device comprises a receiving unit for receiving the input message, the input message comprising multiple input parts, an encoding unit arranged to, for each part of the input message distribute the part of the input message into multiple shares by applying multiple distribution functions to the input message to obtain the multiple shares, wherein a combining function applied to the distribution functions equals the part of the input message apply an injective mapping from the input message to obtain multiple states, the number of multiple shares and multiple states being the same encoding each share of the multiple shares together with a corresponding state of the multiple states, obtaining multiple encoded shares representing the part.

The encoding device may, but need not, be comprised in the cryptographic device.

The cryptographic and encoding devices are electronic devices. For example, they may be a mobile electronic device, such as a phone or a tablet. They may be a set-top box, computer, media player, television, and the like.

The method of cryptographic processing and encoding described herein may be applied in a wide range of practical applications. Such practical applications include digital content management, secure banking, access control, protection of electronic storage, and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically illustrates an example of encoding a variable, FIG. 2 schematically shows an example of an embodiment of a cryptographic device, FIG. 3 schematically shows an example of an embodiment of an encoding device, FIG. 4a schematically shows an example of an embodiment of a table network, FIG. 4b schematically shows an example of an embodiment of a table network, FIG. 5a schematically shows a flow chart for a cryptographic method, FIG. 5b schematically shows a flow chart for an encoding method, FIG. 6 schematically shows a flow chart for the DES block cipher, FIG. 7a schematically shows a computer readable medium having a writable part comprising a computer program according to an embodiment, FIG. 7b schematically shows a representation of a processor system according to an embodiment.

DETAILED DESCRIPTION OF PREFERRED EMBODIMENTS

Figure 1:
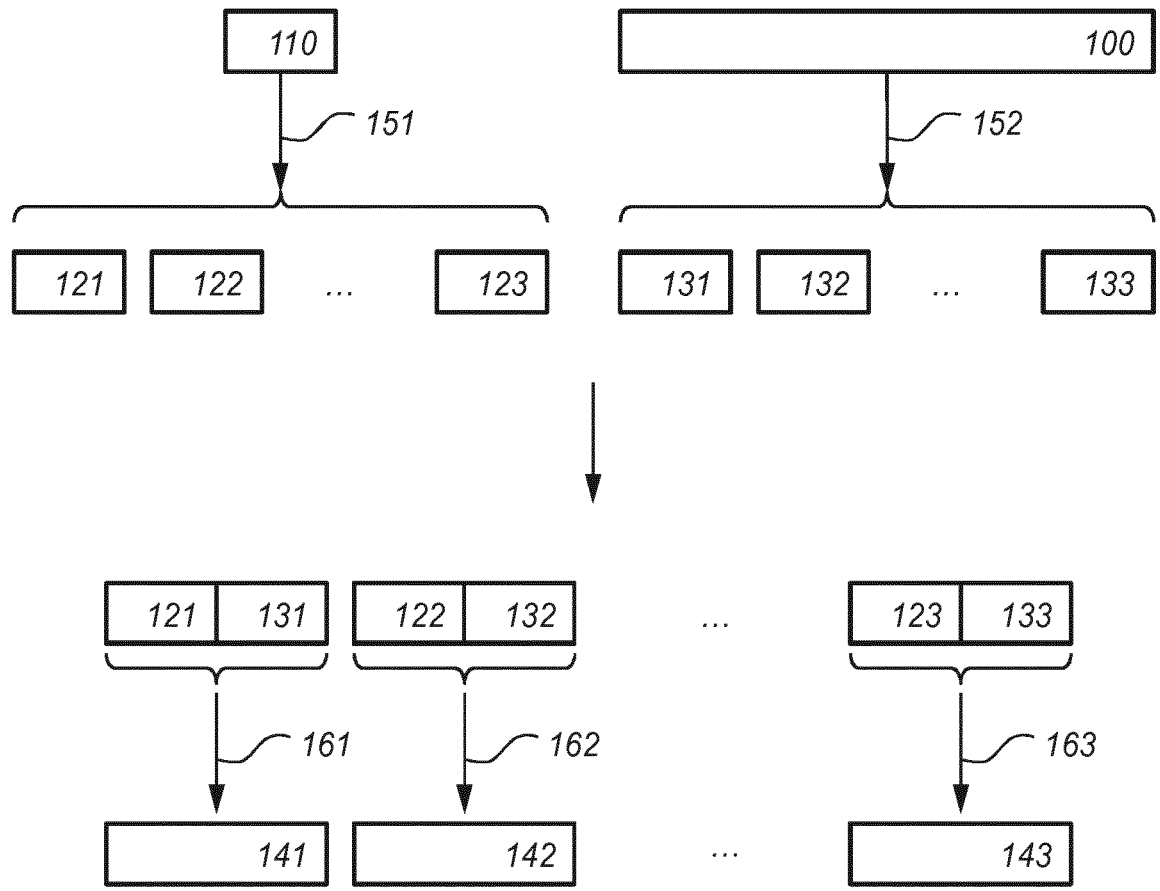

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described above or recited in mutually different dependent claims.

Figure 2:
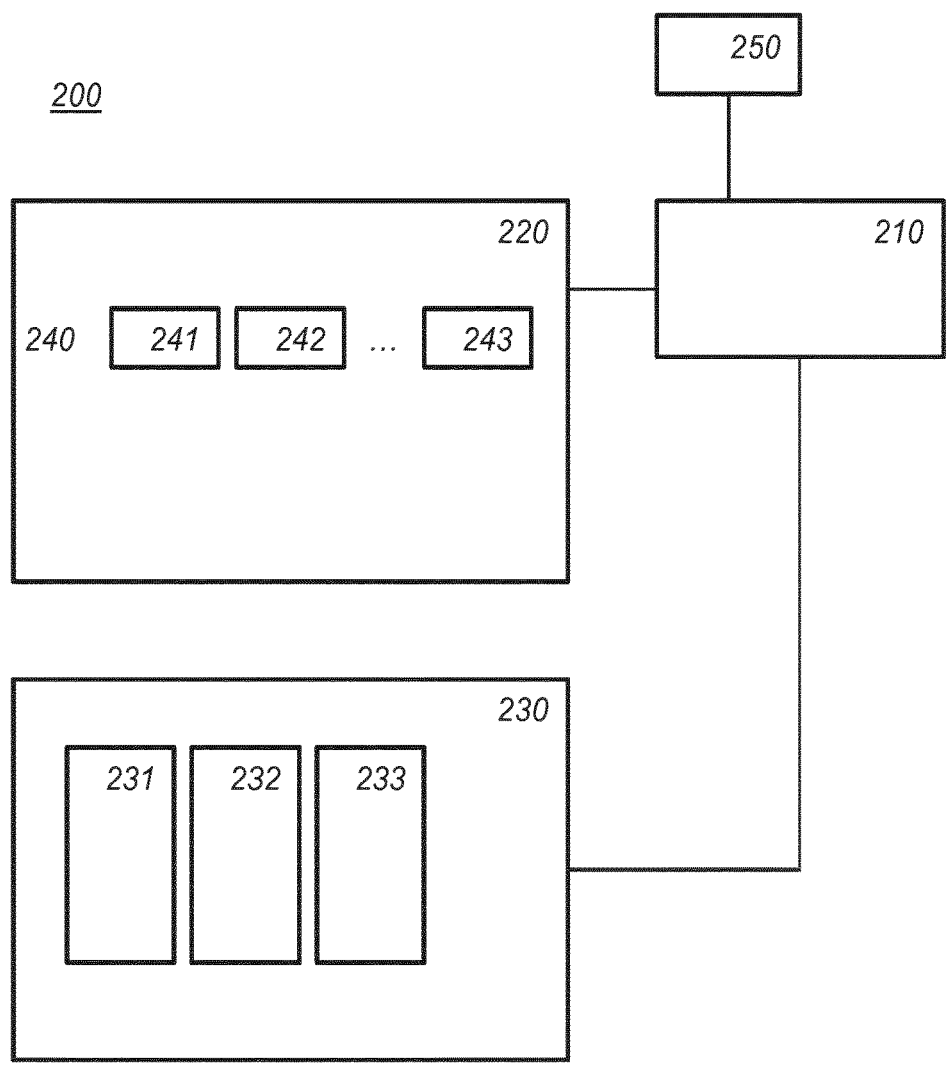

FIG. 2 schematically shows an example of an embodiment of a cryptographic device 200. Possible embodiments of aspects of cryptographic device 200 are illustrated with reference to FIGS. 1-4.

Cryptographic device 200 is arranged to compute a key K dependent cryptographic function for an input message M. The cryptographic function may be denoted as $f_K$. The result of the computation is an output message $f_K(M)$. Note that the key need not be an explicit input of the function, but may also be embedded therein, e.g., using partial evaluation.

Key dependent cryptographic functions are vulnerable to so-called collision attacks. In such an attack, the attacker tries to find two different input messages M and M' for which some internal key dependent variable w has the same value at some point during the computation of cryptographic function $f$.

Consider an internal variable w which depends both on the input message and the key. We will denote the relationship between input message, key and variable as $w=g_K(M)$. Suppose the attacker has found two messages M and M' for which $g_K(M)=g_K(M')$. This information may be exploited using correlation attacks, based on for example Mutual Information Analysis. In particular, the attacker now has an equation $g_K(M)=g_K(M')$; any K that does not satisfy this equation cannot be the key. Furthermore, as only key K is unknown, solving for K may directly provide information on the secret key. To make this attack even worse, many block ciphers have variables, especially in early rounds which depend on relatively few bits of the secret key K.

Internal variables which have the same value for different input message may be revealed using a side channel. For example, by probing the hardware on which the computation runs. Collision attacks are particularly powerful if the cryptographic function is executed in software, since an attacker may more easily verify if some internal variable has the same value or not. An attacker may be able to take full control over the software that runs on a computing device, e.g., a smartphone or a desktop computer, etc.

The key dependent cryptographic function may for example be a block cipher for encrypting or decrypting the input message M. Other examples include key-ed hashes, message authentication functions, stream ciphers, and the like. One example of a block cipher is given in FIG. 6.

Figure 6:
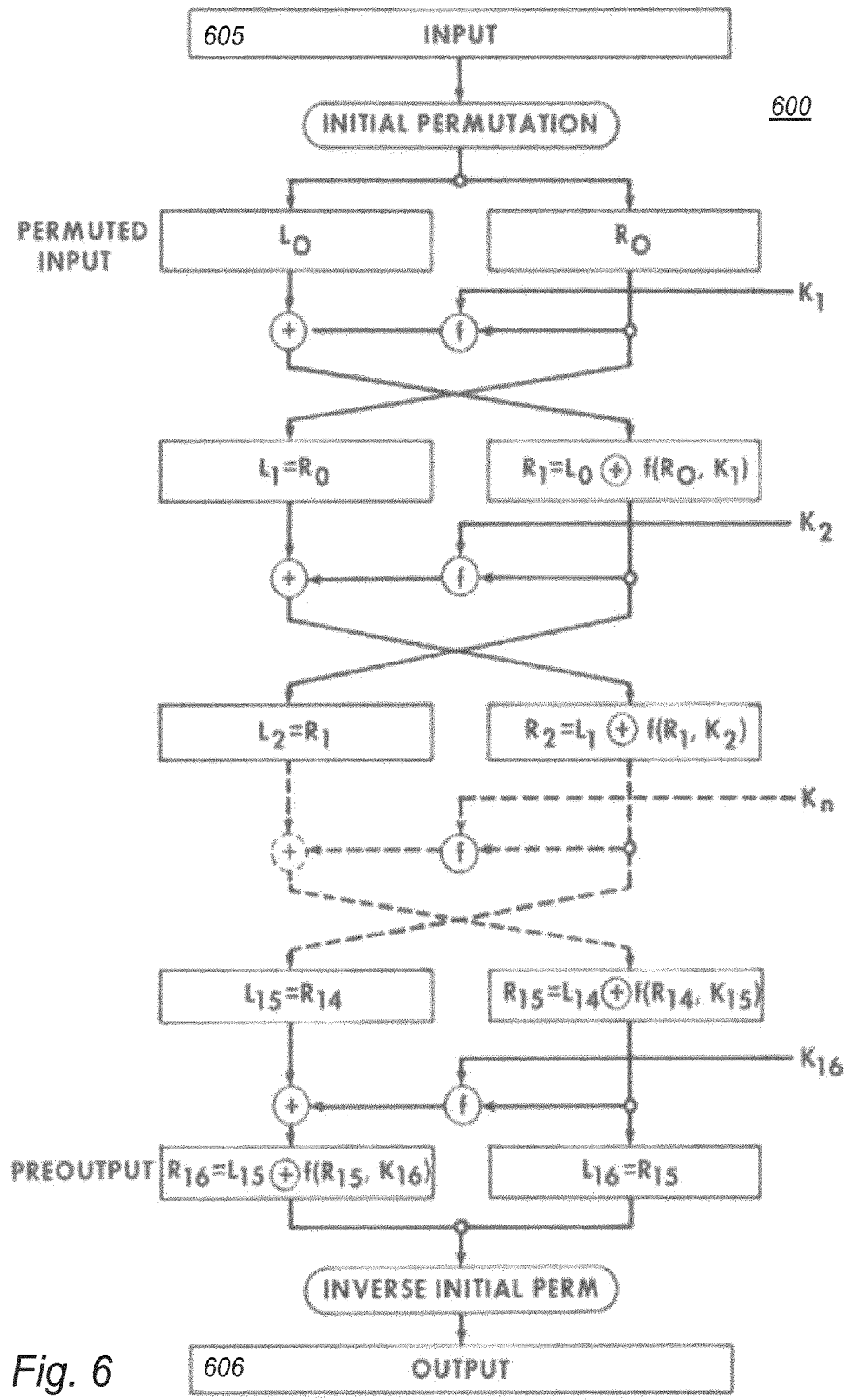

FIG. 6, which is copied from FIPS 46-3 (incorporated herein by reference), illustrates the DES block cipher in particular and Feistel block ciphers in general. The block cipher receives a block cipher input 605 on which a sequence of block cipher rounds acts; in the case of DES there are 16 rounds, for triple DES 48. The first block cipher round acts on the block cipher input 605, each one of the next rounds acts on the output of the previous rounds. In a block cipher round a round function is applied to part of the previous round's output. The block cipher input has a data size, in case of DES of 64 bits. Each block cipher round modifies its block cipher round input to produce a block cipher round output. All block cipher round input and output have the same data size. The Data Encryption Standard describes a keyed block encoding of a 64-bit block. The key is officially 64 bits, but only 56 bits thereof are actually used in the encryption on which the round keys $K_1$ to $K_{16}$ depend. Note that much of the intermediate data depends on both the input message and the key, which may be exploited in the manner described above. For example, the output of an S-box is vulnerable to a collision attack (S-boxes are not separately shown in FIG. 6). For example, the variables that represent the output of the round function (shown in FIG. 6 as are vulnerable to a collision attack.

A potential improvement over a naive implementation of the block cipher of FIG. 6 is to encode a variable w, possibly together with a state variable s. Instead of computing on w directly, such an implementation may operate on a value x=Enc(w,s). However, encoding on itself does not prevent collisions. Two input messages M and M' for which the encoded variable x is the same still give rise to the same equation $g_K(M)=g_K(M')$.

Another potential improvement, is to distribute the variable w over multiple shares $w^j$, for example such that $w=\Sigma_{j=0}^{n-1}w^j$. However, a simultaneous collision on the shares $w^j$ will still lead to a collision for w which leaks the same amount of information. Although a collision may be become rarer, they are not eliminated.

Note that for a collision attack to succeed it does not matter if the key is encrypted or only implicitly present in the implementation, e.g., embedded through partial evaluation. As collisions attacks bypass the encoding of the data, they are particularly worrisome for white box cryptography since they often rely on encoding of internal data, e.g. variables, keys, and constants.

The inventors have realized there is a significant additional problem. In a software implementation one might be inclined to use a pseudo-random number generator (RNG) to create some of the shares of w, but this is not advisable. An attacker may be able to remove the randomness by replacing the output of the RNG by a non-random value. Even if a software implementation makes a call to a true random number generator this may be intercepted. In principle this attack could also be carried out on a hardware implementation, although this will be considerably harder.

The following example illustrates the problem. Suppose an implementation of a key-dependent cryptographic function distributes a variable w over n shares, but uses random values for most of the shares. For example, suppose that $w_0$ to $w_{n-2}$ are generated with a random number generator in software, and $w_{n-1}=w-\Sigma_{i=0}^{n-2}w_i$. Although information theoretically the variable w may seem to be perfectly distributed over the n shares—no subset of the n shares gives any information on w, this choice is still vulnerable to a collision attack. The attacker would fix the random number source to give constant values for $w_0$ to $w_{n-2}$. After this change, a collision on $w_{n-1}$ is sufficient to obtain information on the key. Getting a collision on $w_{n-1}$ only is much less rare than a simultaneous collision on all shares.

Note that a random number source may be recognized easily in software by executing the software multiple times on the same input. Divergent execution indicates a random number generator. Such analysis of a software program may also be automated.

FIG. 1 illustrates a way to encode a variable w which can eliminate collisions for that variable. FIG. 1 shows a variable 110, w and illustrates how w may be encoded for use in a cryptographic device such as cryptographic device 200 such that collision on w are avoided.

Variable 110, w is distributed over multiple shares $w^j$. We will refer to the bit size of w as k. In an embodiment, the bit size of the share $w^j$ equals the bit size of w. Different variables may have different bit sizes. For example, k may be 4 or more. In an embodiment, k=4,5,6,7,8, or more. Shown are shares 121, 122 and 123.

The shares may be chosen such that $w=\Sigma_{j=0}^{n-1}w^j$. In an embodiment, this sum uses the XOR function to sum, however other choices are possible. For example, the sum may use the arithmetical addition modulo $2^k$.

More generally, a combining function $(d(w^0, \ldots, w^{n-1})=w)$ may be defined that maps the shares $(w^j)$ to the variable (w). The combining function may be the XOR or arithmetic addition referred to above. The combining function has the property that that the mapping from any single share $(w^k)$ to the variable (w), obtained by fixing the values of the other shares $(w^0 \ldots, w^{k-1}, w^{k+1}, \ldots, w^{n-1})$ is a bijection. That is, the function $d(\overline{w}^0, \hat{w}^{k-1}, w^k, \hat{w}^{k+1}, \ldots, \hat{w}^{n-1})$ is a bijection; the elements $\hat{w}^j$ denoting a fixed value. This property ensures that no subset of shares gives information on w. Many such combining functions exist. For example, d may be any linear combination of the shares $w=\Sigma_{j=0}^{n-1}\alpha_j w^j$ in which the coefficients $\alpha_j$ are odd; the sum using arithmetical addition modulo $2^k$. The combining function may be polynomial.

FIG. 1 further shows multiple states $s^j$. Shown are states 131, 132 and 133. The number of shares 121-123 is the same as the number of states 131-133. States are redundant data which introduce redundancy into the encoding of a variable. Each one of the shares is arranged with one of the states and encoded into an encoded share: $x^j=Enc_j(w^j, s^j)$. In an embodiment, encodings $Enc_j$ are different. For example, the encodings $Enc_j$ may be chosen at compile time at random. It is not strictly necessary that an encoding is bijective, as long as it is invertible with respect to $w^j$, that is, with knowledge of $Enc_j$ and $x^j$ the share $w^j$ can be recovered. Nevertheless, in embodiments the encodings $Enc_j$ are bijective. The latter being a more practical choice in an implementation and simplifies analysis. Once it has been decided which variables will be encoded with which encodings at which point, the tables may be simply adapted to take the encoding into account.

FIG. 1 shows that share 121 and state 131 are encoded though encoding 161 into an encoded share 141. Also share 122 and state 132 are encoded though encoding 162 into an encoded share 142; share 123 and state 133 are encoded though encoding 163 into an encoded share 143. We will refer to the states and shares which are encoded together to represent a variable w, as corresponding to that variable.

Multiple encoded shares are the result, of which are shown encoded shares 141, 142, and 143. Variable w is represented in cryptographic device 200 as multiple encoded shares. Neither the un-encoded shares 121-123 nor the states 131-133 should occur in the cryptographic device.

The inventors realized that by choosing the states in a special way collisions on w may be avoided. That is there are no two different input messages M and M' such that the all encoded shares 141-143 are the same.

The multiple states $s^j$ corresponding to the same variable w are chosen such that there exists an injective mapping 152, denoted as E, from the input message M to the multiple states $(\Sigma(M)=(s^0, \ldots, s^{n-1})$. An injective map has the property that $\Sigma(M)=\Sigma(M')$ if and only if $M=M'$. In particular, $\Sigma$ may be chosen to be bijective, as this more stringent condition implies injectivity. FIG. 1 shows how multiple states 131-133 depend on input message 100, M, and the injective map $\Sigma$, 152.

As the states encode the input message M, 100, different M will lead to different encoded variables: $x^0, \ldots, x^{n-1}$. This can be done as follows: choose an integer l such that $n \cdot l \geq \text{bitsize}(M)$. Herein, n denotes the number of state, l is the bit size of a state. The number of shares is also n. Thus a total bit size of the multiple states $s^j$ corresponding to the same variable w is at least as large as the bit size of the input message M. The encodings $Enc_j$ are chosen, e.g., at random, from the bijective functions $\mathbb{Z}_2^k \times \mathbb{Z}_2^l \to \mathbb{Z}_2^{k+l}$ The bit size of the states need not equals the bit size of the shares.

We will take DES as a first example. In DES the input message is 64 bit. Suppose internal variables are 4 bit long and distributed over 6 shares. In this case the state size has to be at least $164/61=11$ bit. In this case a variable may be encoded by 6 encoded shares of $4+11=15$ bits each. In this case the total bit size of the states will be $6 \cdot 11=66$ bits. Since 66 is larger than the input message bit size 64, the mapping E will be injective but not bijective.

Suppose, also using DES as an example, that internal variables are 4 bits long and distributed over 16 shares. In this case the state size has to be at least $164/161=4$ bit. Using bits for a state, in this case an encoded share will be $4+4=8$ bits. The total bit size of the states corresponding to the same variable is $16*4=64$ bit. Since this equals the input message bit size, the injective mapping is bijective. In general if the total bit size of the shares, e.g., nk equals the bitsize of the input message M, the bit size of the shares may be equal to the bit size of the shares.

As a further example, consider the block cipher AES, with input message bit size of 128. If variables are distributed over 16 shares, the states may be $128/16=8$ bits. If the shares are also 8 bits, an encoded share will be 16 bit.

The mapping 152 does not need to be explicit in the implementation of the cryptographic function for most or all variables. For example, once an encoded variable has the required injective relationship with the input message, operations performed on the share parts $w^j$ of an encoded variable may simultaneously perform redundant operations on the state parts that preserve the injective relationship. As the computations are done in the encoded domain the computations on the states cannot be separated from the computations on the shares.

For example consider that first and second variables $w_1$ and $w_2$ are both encoded as indicated above as multiple encoded shares $x_1^0, \ldots, x_1^{n-1}$ and $x_2^0, \ldots, x_2^{n-1}$. Suppose an operation g on $w_1$ and $w_2$ computes a third variable $w_3 = g(w_1, w_2)$. The variable $w_3$ is represented as encoded shares $x_3^0, \ldots, x_3^{n-1}$. In an embodiment the states encoded in $x_3^0, \ldots, x_3^{n-1}$ are equal to the states encoded in $x_1^0, \ldots, x_1^{n-1}$ or in $x_2^0, \ldots, x_2^{n-1}$. In this case, if the inputs have the required relationship with the input message M, then so will the output $w_3$. In this way the required relationship may be preserved throughout the computation. The operation may be implemented as a table network for performing the operation, which in turn may be a sub-network of the table network implementing the cryptographic function.

Instead of taking the states of the third variable equal to the states of one of the inputs, also a further injective mapping $\Sigma_2$ may be applied, e.g. $(s_3^0, s_3^1, \ldots, s_3^{n-1}) = \Sigma_2 (s_i^0, s_i^1, \ldots, s_i^{n-1})$, in which i indicates one of the input variables, e.g. $i=1$ or 2. By constructing $\Sigma_2$ as a set of n bijections that operate only one state, this does not enlarge the table network, as the mapping may be integrated with existing tables.

Thus, in an embodiment, the redundant operations may be bijective operations. The bijective functions may be chosen randomly, e.g., at compile time. In an embodiment, for variables that depend only on the input message, the states may be obtained as an injective function of the input message. For a variable that depends on an encoded variable for which the shares have an injective relationship with the input message, the new shares $(s_2^j)$ may be obtained by applying a set of bijective functions $(g_j)$ to the corresponding share of the encoded variable $(s_2^j=g_j(s_1^j))$. It is possible to make the states of the third variable dependent upon both of the states of the input variables and still maintain the required relationship with the input message. However, this may enlarge the table network.

Initial variables, e.g., those that are directly obtained from the input message, may be received by cryptographic device 200 in the correct encoded form. Alternatively, device 200 may comprise an encoding device as described below.

The encoding of the variable w ensures that there cannot be a collision on the encoded value during the execution of the cryptographic function. Accordingly, no collision attack is possible at this point. If all variables that depend on the input message as well as on the key are encoded in this way throughout the computation of the cryptographic function, then collisions may be entirely avoided. Moreover, the system is simple, efficient, provable, and elegant.

In a practical embodiment, there will be no other representations of w than the representation through encoded shares. Furthermore, the protection is more effective if more of the sensitive variables are protected in this manner. Preferably, all variables that depend both on the key and on the input message are protected. To prevent collision attacks it is not required that the input messages is represented as encoded shares before an operation with the key is performed. However, ensuring that the injective mapping exists and is maintained is simplified by having the input message encoded as multiple sets of encoded shares even before the key is used.

Returning to FIG. 2; Cryptographic device 200 comprises a data store 220 arranged to store multiple variables on which the cryptographic device acts to compute the cryptographic function. A variable 240 is represented in data store 220 as multiple encoded shares. Shown are encoded shares 241, 242, and 243. The variable is both distributed over multiple shares, and each share is encoded together with a state. There exists an injective mapping ($\Sigma$) from the input message (M) to the multiple states, as explained with reference to FIG. 1.

Cryptographic device 200 comprises a table store 230 storing multiple look-up tables. Shown in FIG. 2 are look-up tables 231, 232 and 233. At least some of the look-up tables take as input one or more encoded shares of one or more variables. In an embodiment, a look-up table takes as input at least one encoded share from two different variables. The multiple look-up tables together form a table network implementing the cryptographic function.

Figure 4A:
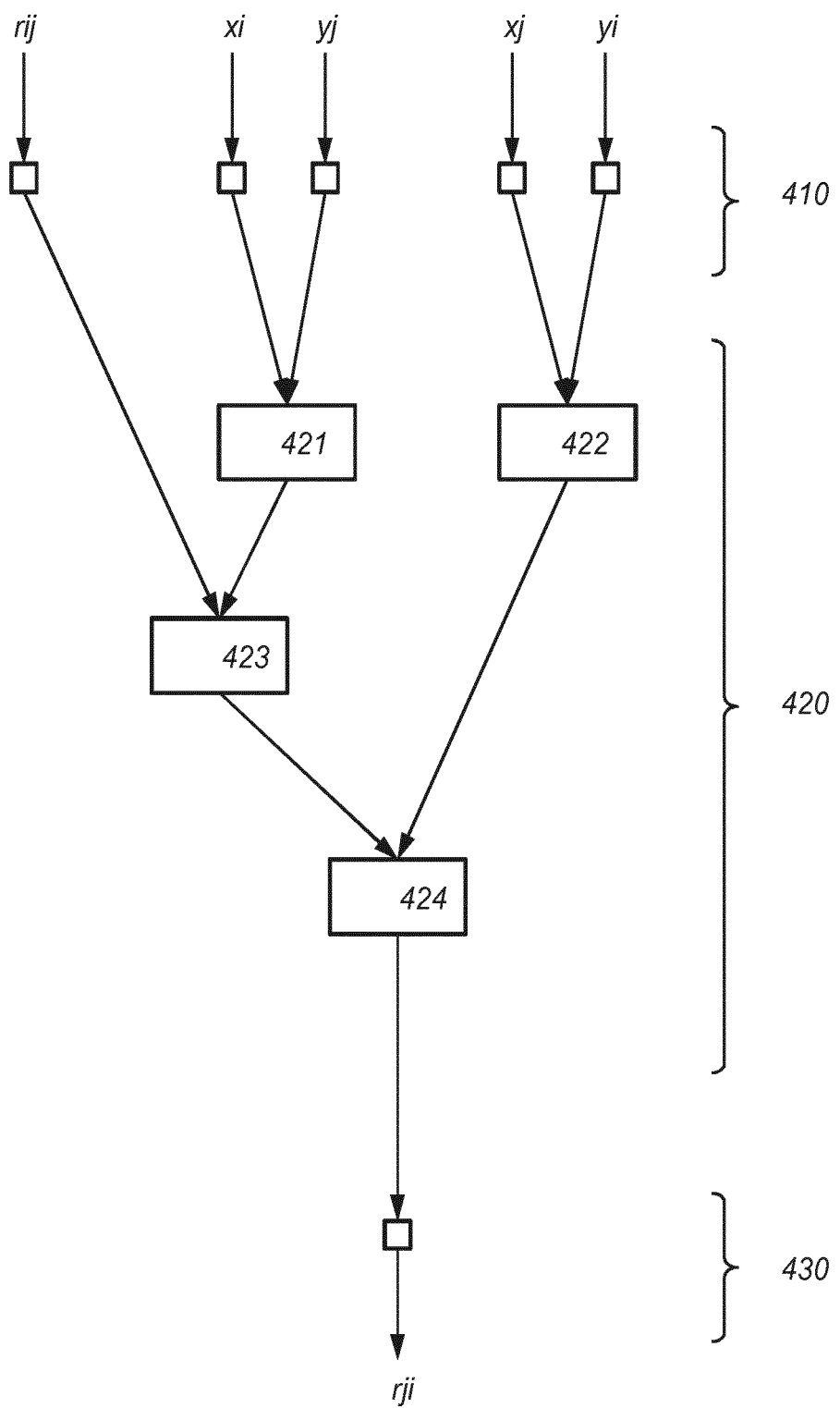

Table networks are known from white-box cryptography per se. See for example, "White-box cryptography and an AES implementation", by Chow et al. An example of a table network 420 is shown in FIG. 4a, in this case a table network for computing cross-products.

A table network receives one or more inputs, e.g. inputs 410, and produces one or more outputs, e.g. outputs 430. In table network 420 multiple look-up tables are shown; shown are tables 421-421. Tables take inputs directly from inputs 410 and/or the outputs of other tables. A table may take a single input, two inputs, or more than two inputs.

A convenient way to convert a computation on un-encoded variables w to a computation on variables w encoded as multiple shares is provided in "Higher-Order Masking Schemes for S-boxes", by Carlet et al. The paper does not discuss collision attacks or encoding with states. The paper is further referred to as Carlet. Carlet does not prevent a collision on a variable encoded as multiple shares.

Below it is explained how a calculation on a variable w, for instance to calculate the function value S(w) may be transformed to a calculation on variable w encoded in multiple shares. The function S may be any internal step of the computation of the cryptographic function, e.g., an addition, a multiplication, an S-box, etc. We will show how to construct a table network that computes S(w) on shares. First we will consider here the case in which S has a single input w. Multiple states can be handled analogously. We will also first ignore states, later we will show how states can be added.

If w is represented by n shares $w_0, \ldots, w_{n-1}$ then we want to represent S(w) by n shares as well, in order to give the resulting variable the same protection as w. This is possible, for any function by making use of the following facts.

For the exposition, we first assume that the value S(w), like w, is also a k-bit number. The k-bit numbers can be considered to be elements of the finite Galois field $\mathcal{F}_{2^k}$, and the function S as a function on $\mathcal{F}_{2^k}$. All functions in finite fields are polynomials, thus, for any function S on $\mathcal{F}_{2^k}$, there exist coefficients $c_0, \ldots, c_{2^k-1}$ such that for any w it holds that $$S(w) = \Sigma_{r=0}^{2^k-1} c_r w^r$$

The polynomial may be expressed as a computation on shares as follows. Let the shares be given by $X=(x_0, \ldots, x_{n-1})$ and $Y=(y_0, \ldots, y_{n-1})$ For simplicity we will assumes that the sum of the shares equals the unencoded variables.

The sum of X and Y can be encoded with shares $x_i+y_i$. The scalar multiple $\alpha X$ may be encoded with shares $\alpha x_i$. Finally, let Z be the product of X and Y. Define for $0 \le i < j \le n-1$, the values $r_{i,j}$ and $r_{j,i}$.

Take for $r_{i,j}$ a random element of $\mathcal{F}_{2^k}$, e.g., by choosing a random k-bit string. In an embodiment, the random number for $r_{i,j}$ is obtained by selecting compile time a randomization function $R_{i,j}$ from the input message M to $T_{2^k}$, and setting $r_{i,j}=R_{i,j}(M)$. The latter has the advantage that reliance on a random number generator is avoided at execution time. Only when the table network is constructed, referred to as compile time, is a source of randomness needed. It is noted that Carlet relies on randomness during execution time. This opens Carlet up to manipulation of the random number source during execution. In particular, the random number generator may be intercepted and replaced with constant values.

Take for $r_{j,i}=(x_iy_j+r_{i,j})+x_jy_i$; the order of computations herein is important, and indicated by brackets. Now for $0 \le i \le n-1$ take $$z_i = x_i y_i + \sum_{\substack{j=0 \\ j \ne i}}^{n-1} r_{i,j}.$$

A cross-product table sub-network may compute $r_{j,i}$. These tables compute the two cross products $x_iy_j$ and $x_jy_i$.

In an embodiment, the randomization function $R_{i,j}$ to compute for computing $r_{i,j}$ is implemented as a table network taking the input messages as input. This avoids the need for a random number source during execution.

The shares $z_i$ now represent the product of X and Y. Using the addition, scalar multiplication and multiplication operations the polynomial representation for S may be expressed as operation on the shares. The operation on the shares in turn may be implemented as a look-up table, taking as input one or more shares and or random numbers.

A possible table network 420 to compute $r_{j,i}$ is illustrated in FIG. 4a. Tables 421-424 cooperate to compute $r_{j,i}$. The inputs to table network 420 are shown are reference 410. The output of table network 420 is shown at reference 430.

For example, tables 421 and 422 may be arranged to multiply their inputs, whereas tables 423 and 424 may be arranged to add their inputs. Note that each of the tables may use different encodings.

FIG. 4b schematically shows an example of an embodiment of a multiplication table network 440. Multiplication table network 440 may be constructed using the formulas given above to compute $Z=(z_0, \ldots, z_{n-1})$. Multiplication table network 440 is arranged to multiplying a variable X represented in data store 220 as a first multiple of encoded shares ($x^j$), and a second variable Y represented in the data store 220 as a second multiple of encoded shares ($y^j$). The multiplication table network acts on the first and second multiple of encoded shares ($x^j$, $y^j$) and obtains a third multiple of encoded shares ($z^j$) representing the product of the first and second variable. Multiplication table network 440 may be part of the table network for computing the cryptographic function.

Multiplication table network 440 may comprise cross-product table sub-networks to compute cross products, $x_iy_j$. In an embodiment cross products are computed in pairs $x_iy_j+x_jy_i$. For example, multiplication table network 440 may comprise table network 420. Multiplication table network 440 may also comprise a table network 450 to compute one or more randomization functions $R_{i,j}$. In FIG. 4b, table network 450 depends on input message 110. This dependence has been indicated with a dashed line to indicate that the dependence may be obtained through an intermediate, e.g., variables stored in data store 220. Table network 440 may obtain its inputs and store its outputs in data store 220.

A table acting on shares may be transformed to a table acting on encoded shares. Define s and t such that for an encoded share x we have $Enc(t(x), s(x))=x$. The functions s and t obtain the state and share from x respectively. Let a table T for t(x) be defined. Then $Enc'(T(t(x)), P(s(x)))$ defines a table for x that implements the table T for the share part of x and a function P for the state part. The function P is redundant and may be chosen when creating the table network, e.g., at compile time. For example, P may be the identity function. Similar constructions are possible for multiple inputs. The encoding Enc used here is also called the input encoding. The encoding Enc' is called the output encoding. The input and output encodings of a table need not be the same, as long as the output encoding used for the output of a table is the same as the input encoding of a next table which used said output as an input.

The data store 220 and table store 230 may be an electronic memory. They may be two parts of the same memory. The table store 230 may be non-volatile storage. The data store 220 may be volatile storage.

Cryptographic unit 200 comprises a control unit 210 configured to apply the cryptographic functions to the input message by applying the multiple look-up tables to the variables represented in the data store. For example, the table store 230 may comprise instructions that indicate the order in which the tables are to be applied to which variables. Cryptographic unit 200 may comprise a network interface 250. Network interface 250 may be arranged to receive encoded data over a computer network. For example cryptographic device 200 may receive encrypted data, e.g., encrypted content, which is decrypted by cryptographic device 200. The input received over network interface 250 may be represented as encoded shares, e.g., as described above. This is not necessary as the encoding may be done inside of device 200.

Figure 3:
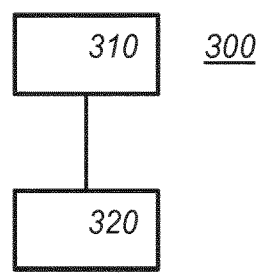

FIG. 3 illustrates an example of an encoding device 300. Encoding device 300 is arranged to encode an input message M for use with a cryptographic device as in claim 1. Encoding device 300 comprises a receiving unit for receiving the input message M. The input message comprising multiple input parts $M=(m_0, m_1, \ldots)$. For example, the multiple parts may be nibles or bytes. In an embodiment the bit size of the parts are between 4 and 8 (inclusive). The message M may be a concatenation of the message parts.

Encoding device 300 comprises an encoding unit 320 that performs the encoding. Encoding unit 320 encodes each part of the input message M seperately. So for each part $m_i$ of the input message M, the encoding unit performs the following:

The part $m_i$ of the input message M is distributed into multiple shares by applying multiple distribution functions $h_i^j$ to the input message to obtain multiple shares $w_i^j=h_i^j(M)$. A combining function applied to the distribution functions $h_i^j$ applied to M equals the part $m_i$ of the input message: $d(h_i^0, \ldots, h_i^{n-1})(M)=m_i$. In particular, if the combining function is the XOR or arithmetic sum, then the sum of the distribution functions $h_i^j$ equals the part $m_i$ of the input message M, so that $\Sigma_j h_i^j(M)=m_i$.

For example, in case there are an even number of shares the distribution functions may be chosen as $h_i^j=m_i+m_j$ for $i \neq j$ and $h_i^i=\Sigma_{t \neq j} m_t$. In this example, the addition is an XOR. Many other possibilities are possible. For example, all but one of the distribution functions for a give part may be chosen randomly and the last may be computed as a correction term, e.g., the projection function of M to $m_i$ minus the other distribution functions.

The encoding unit 320 also applies an injective mapping E, from the input message M to obtain multiple states $s_i^j$, the number of multiple shares and multiple states being the same. In an embodiment, the $s_i^j=m_j$; this choice clearly guarantees that the input message M is encoded in the states. The concatenation of all shares is an injective map on the input message M.

Finally, each share of the multiple shares is encoded together with a corresponding state of the multiple states, obtaining multiple encoded shares $x_i^j$ representing the part $m_i$. For example, encoding unit 320 may compute $x_i^j=Enc_i^j(w_i^j, s_i^j)$.

After this step the part $m_i$ is encoded in multiple encoded shares $x_i^j$ such that the entire input message is encoded as part of the states in the encoded shares.

The table network implementing the cryptographic function is arranged to preserve the relationship between the input message and the states of encoded shares that correspond to a variable. Since a collision on a set of encoded variable implies a collision on the state, this means that a collision with different input messages is impossible.

As an additional example the injective mapping $\Sigma_i$ used to map M to states in the encoding unit may be composed of multiple smaller bijective functions. For example, the injective mapping $\Sigma_i$ may comprise multiple state functions $g_i^j$. Obtaining multiple states $s_i^j$ comprises applying the multiple state functions $g_i^j$ to respective multiple input parts $s_i^j=g_i^j(m_j)$, wherein the multiple state functions are bijective. For example, $\Sigma_i(M)=) (g_i^0, \ldots, g_i^{n-1})(M)=(s_i^0, \ldots, s_i^{n-1})$. This is a particular easy way to create a bijective, and thus also injective function. If more states needs to be filled, more state functions may be added, in which case the function $\Sigma_i$ becomes strictly injective instead of bijective.

Typically, the devices 200 and 300 each comprise a microprocessor (not shown in FIGS. 1-4) which executes appropriate software stored at the device 200 and the 3000; for example, that software may have been downloaded and/or stored in a corresponding memory, e.g., a volatile memory such as RAM or a non-volatile memory such as Flash (not shown in FIGS. 1-4). Alternatively, the devices 200 and 3000 may, in whole or in part, be implemented in programmable logic, e.g., as field-programmable gate array (FPGA). Devices 200 and 300 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, device 200 comprises a data store circuit and a table store circuit, e.g., electronic memories, and a control unit circuit. The circuits implement the corresponding units described herein. The circuits may be a processor circuit and storage circuit, the processor circuit executing instructions represented electronically in the storage circuits. The circuits may also be, FPGA, ASIC or the like. The system may comprise additional circuits, e.g., a network interface circuit, etc.

FIG. 5a shows a flowchart that illustrates a cryptographic method 500 arranged to compute $f_K(M)$ a key K-dependent cryptographic function $f$ for an input message M. Cryptographic method 500 comprises storing 510 multiple variables w on which the cryptographic device acts to compute the cryptographic function, a variable w being distributed over multiple shares $w^j$ and represented in the data store as multiple encoded shares $x^j$, an encoded share being an encoding $x^j = \text{Enc}_j(w^j, s^j)$ of a share $w^j$ together with a state $s^j$, the multiple states $s^j$ corresponding to the same variable w having a relationship with the input message M so that there exists an injective mapping E from the input message M to the multiple states $\Sigma(M) = (s^0, \ldots, s^{n-1})$, storing 520 multiple look-up tables, a look-up table taking as input one or more encoded shares of one or more variables, the multiple look-up tables together forming a table network implementing the cryptographic function, applying 530 the cryptographic function to the input message by applying the multiple look-up tables to the variables represented in the data store.

FIG. 5b shows a flowcharts that illustrates an encoding method 550 for encoding an input message M for use with a cryptographic device as in claim 1, the encoding method comprising receiving 560 the input message M, the input message comprising multiple input parts $M = (m_0, m_1, \ldots)$, for each part $m_i$ of the input message M distributing 570 the part $m_i$ of the input message M into multiple shares by applying multiple distribution functions $h_i^j$ to the input message to obtain the multiple shares $w_i^j = h_i^j(M)$, wherein a combining function applied to the distribution functions $h_i^j$ equals the part $m_i$ of the input message $d(h_i^0, \ldots, h_i^{n-1})(M) = m_i$; $\Sigma_j h_i^j(M) = m_i$ applying 580 an injective mapping $\Sigma_i$ from the input message M to obtain multiple states $s_i^j$, the number of multiple shares and multiple states being the same encoding 590 each share of the multiple shares together with a corresponding state of the multiple states, obtaining multiple encoded shares $x_i^j$ representing the part $m_i$.

Method 550 has several options how to distribute the work for each part of the input message. For example, method 550 may first compute shares for all parts, then compute states for all parts and finally do encoding for all parts. However, method 550 may also compute shares, states, and encoding for one part at a time. Other combinations are possible.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 570 and 580 may be executed, at least partially, in parallel. Moreover, a given step may not have finished completely before a next step is started.

A method according to the invention may be executed using software, which comprises instructions for causing a processor system to perform method 500 or 550. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
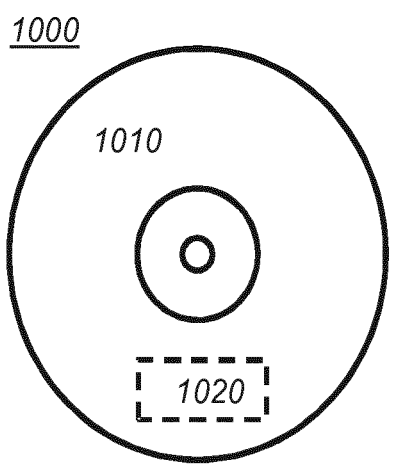

FIG. 7a shows a computer readable medium 1000 having a writable part 1010 comprising a computer program 1020, the computer program 1020 comprising instructions for causing a processor system to perform a cryptographic method or an encoding method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said a cryptographic method or an encoding method, according to an embodiment.

Figure 7B:
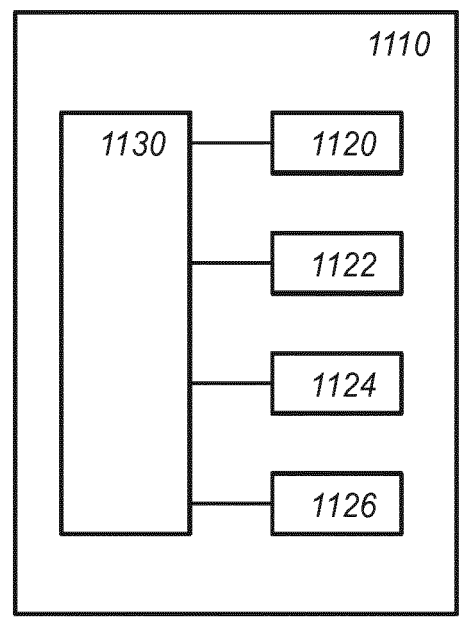

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

LIST OF REFERENCE NUMERALS IN FIGS. 1-4B, AND 6

100 M an input message
110 w a variable
121, 122, 123 $w^0, w^1, \ldots, w^{n-1}$ a share
131, 132, 133 $s^0, s^1, \ldots, s^{n-1}$ a share
141, 142, 143 $x^0, x^1, \ldots, x^{n-1}$ an encoded share
151 h a distributing mapping
152 Σ an injective mapping
161, 162, 163 $Enc_1, Enc_2, \ldots, Enc_{n-1}$ an encoding
200 a cryptographic device
210 a control unit
220 a data store
230 a table store
231, 232, 233 a table
240 a variable
250 a network interface
300 an encoding device
310 a receiving unit
320 an encoding unit
410 table network inputs
420 a table network
421-424 a table
430 table network outputs
440 a table network
450 a table network
600 a flow chart for the DES block cipher
605 an input message
606 an output message

The invention claimed is:

1. A cryptographic device arranged to compute ($f_K^{(M)}$) a key (K)-dependent cryptographic function ($f$) for an input message (M), the cryptographic device comprising
a data store arranged to store multiple variables (w) on which the cryptographic device acts to compute the cryptographic function, a table store storing multiple look-up tables, the multiple look-up tables together forming a table network implementing the cryptographic function, and a control unit configured to apply the cryptographic function to the input message by applying the multiple look-up tables to the variables represented in the data store, characterized in that
a variable (w) is distributed over multiple shares ($w^j$) and represented in the data store as multiple encoded shares ($x^j$), an encoded share being an encoding ($x^j=Enc_j(w^j,s^j)$) of a share ($w^j$) together with a state ($s^j$), the multiple states ($s^j$) corresponding to the same variable (w) having a relationship with the input message (M) so that there exists an injective mapping (Σ) from the input message (M) to the multiple states ($\Sigma(M)=s^0, \ldots, s^{n-1}$)), and
a look-up table takes as input one or more encoded shares of one or more variables, the table network performing operations on the multiple shares ($w^j$) of the encoded variable (W) and simultaneously performing redundant operations on the multiple states ($s^j$) maintaining an injective mapping from the input message (M) to the multiple states.

2. A cryptographic device as in claim 1, wherein a total bit size of the multiple states ($s^j$) corresponding to the same variable (w) is at least as large as the bit size of the input message (M).

3. A cryptographic device as in claim 1, wherein the encoding is a bijection.

4. A cryptographic device as in claim 1, wherein a combining function ($d(w^0, \ldots, w^{n-1})=w$) maps the shares ($w^j$) to the variable (w), the combining function having the property that that the mapping from any single share ($w^k$) to the variable (w), obtained by fixing the values of the other shares ($w^0 \ldots, w^{k-1}, w^{k+1}, \ldots, w^{n-1}$) is a bijection.

5. A cryptographic device as in claim 1, wherein the sum of the multiple shares ($w^j$) equals the corresponding variable ($w=\Sigma_{j=0}^{n-1} w^j$).

6. A cryptographic device as in as in claim 1, wherein
the table store stores a multiplication table network for multiplying a first variable (w) distributed over a first multiple of shares ($w^j$) and represented in the data store as a first multiple of encoded shares ($x^j$) and a second variable (v) distributed over a second multiple of shares ($v^j$) represented in the data store as a second multiple of encoded shares ($y^j$), the multiplication table network acting on the first and second multiple of encoded shares ($x^j,y^j$) obtaining a third multiple of encoded shares ($z^j$) representing the product of the first and second variable,
the multiplication table network comprising one or more cross-product table sub-networks for computing the product of a first share ($w^1$) of the first multiple shares and a second share ($v^2$) of the second multiple of shares, the cross-product table sub-networks computing the sum of the product of the first share and the second share from the corresponding encoded shares plus a randomization function ($R_{1,2}$) from the input message (M).

7. A cryptographic device as in claim 1, wherein
the table store stores a table network for performing an operation, taking as input a first encoded variable ($w_1$) and a second encoded variable ($w_2$) and producing as output a third encoded variable ($w_3$), the table network being arranged so that the multiple states encoded in the third encoded variable ($x_3^0, \ldots, x_3^{n-1}$) depend only on the states encoded in one of the first encoded variable ($x_1^0, \ldots, x_3^{n-1}$) and the second encoded variable ($x_2^0, \ldots, x_2^{n-1}$).

8. An encoding device for encoding an input message (M), the encoding device comprising
a receiving unit for receiving the input message (M), the input message comprising multiple input parts (M= ($m_0, m_1, \ldots$)), and
an encoding unit, characterized in that the encoding unit is arranged to, for each part ($m_i$) of the input message (M)
distribute the part ($m_i$) of the input message (M) into multiple shares by applying multiple distribution functions ($h_i^j$) to the input message to obtain the multiple shares ($w_i^j=h_i^j(M)$), wherein a combining function applied to the distribution functions ($h_i^j$) equals the part ($m_i$) of the input message (M) ($d(h_i^0, \ldots, h_i^{n-1})(M)=m_i$; $\Sigma_j h_i^j(M)=m_i$)
apply an injective mapping ($\Sigma_i$) from the input message (M) to obtain multiple states ($s_i^j$), the number of multiple shares and multiple states being the same
encoding each share of the multiple shares together with a corresponding state of the multiple states, obtaining multiple encoded shares ($x_i^j$) representing the part ($m_i$).

9. An encoding device as in claim 8, wherein the injective mapping ($\Sigma_i$) comprises multiple state functions ($g_i^j$), obtaining multiple states ($s_i^j$) comprises applying the multiple state functions ($g_i^j$) to respective multiple input parts ($s_i^j = g_i^j(m_j)$), wherein the multiple state functions are bijective.

10. A cryptographic device as in claim 1, comprising the encoding device of claim 8.

11. A cryptographic method arranged to compute ($f_K(M)$) a key (K)-dependent cryptographic function ($f$) for an input message (M), the cryptographic method comprising
storing multiple variables (w) on which the cryptographic device acts to compute the cryptographic function, storing multiple look-up tables, the multiple look-up tables together forming a table network implementing the cryptographic function, and applying the cryptographic function to the input message by applying the multiple look-up tables to the variables represented in the data store, characterized in that
a variable (w) being distributed over multiple shares ($w^j$) and represented in the data store as multiple encoded shares ($x^j$), an encoded share being an encoding ($x^j = \text{Enc}_j(w^j, s^j)$) of a share ($w^j$) together with a state ($s^j$), the multiple states ($s^j$) corresponding to the same variable (w) having a relationship with the input message (M) so that there exists an injective mapping ($\Sigma$) from the input message (M) to the multiple states ($\Sigma(M) = (s^0, \ldots, s^{n-1})$),
a look-up table taking as input one or more encoded shares of one or more variables, the table performing operations on the multiple shares ($w^j$) of the encoded variable (w) and simultaneously performing redundant operations on the multiple states ($s^j$) maintaining an injective mapping from the input message (M) to the multiple states.

12. An encoding method for encoding an input message (M) for use with a cryptographic device as in claim 1, the encoding method comprising
receiving the input message (M), the input message comprising multiple input parts ($M = (m_0, m_1, \ldots)$),
for each part ($m_i$) of the input message (M)
distributing the part ($m_i$) of the input message (M) into multiple shares by applying multiple distribution functions ($h_i^j$) to the input message to obtain the multiple shares ($w_i^j = h_i^j(M)$), wherein a combining function applied to the distribution functions ($h_i^j$) equals the part ($m_i$) of the input message (M) ($d(h_i^0, \ldots, h_i^{n-1})(M) = m_i$; $\Sigma_j h_i^j(M) = m_i$)
applying an injective mapping ($\Sigma_i$) from the input message (M) to obtain multiple states ($s_i^j$), the number of multiple shares and multiple states being the same
encoding each share of the multiple shares together with a corresponding state of the multiple states, obtaining multiple encoded shares ($x_i^j$) representing the part ($m_i$).

13. A computer program comprising computer program instructions arranged to perform the method of claim 11 when the computer program is run on a computer.

14. A computer readable medium comprising the computer program in claim 13.

* * * * *